(No Model.)
J. CLASS.
SAW.
No. 459,477.  Patented Sept. 15, 1891.
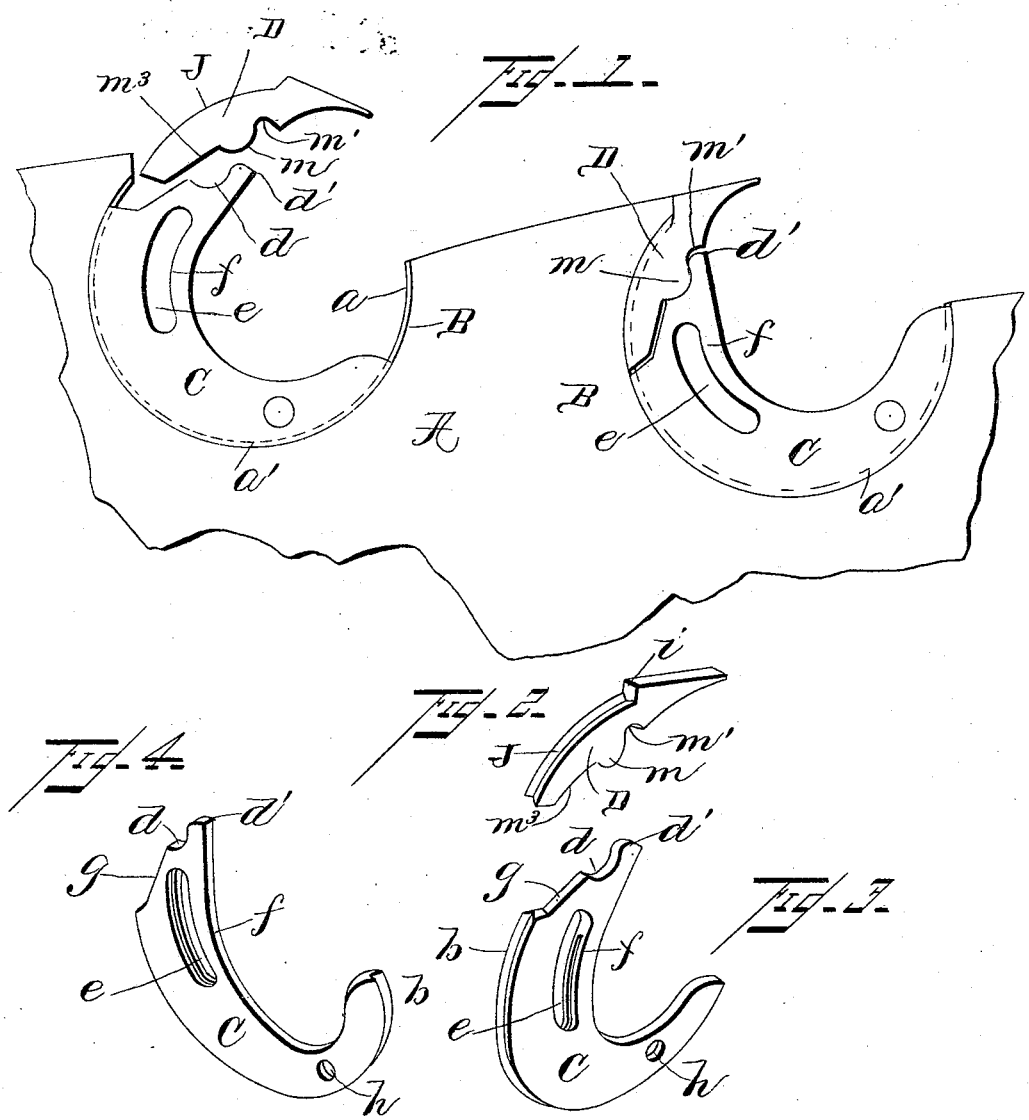
WITNESSES
F. L. Durand
F. W. Barnaclo
INVENTOR
John Class
W. K. Miller
By Benj. G. Cowl Attorney
Asso. Atty.

UNITED STATES PATENT OFFICE.

JOHN CLASS, OF CANTON, OHIO.

SAW.

SPECIFICATION forming part of Letters Patent No. 459,477, dated September 15, 1891.

Application filed March 5, 1891. Serial No. 383,891. (No model.)

*To all whom it may concern:*

Be it known that I, JOHN CLASS, a citizen of the United States, and a resident of Canton, in the county of Stark and State of Ohio, have invented a new and useful Improvement in Saws, of which the following is a full, clear, and exact description, reference being had to the accompanying drawings, making a part of this specification.

My invention relates to improvements in saws; and it consists in certain features of construction and combination of parts, as will be hereinafter described, and pointed out in the claims.

Figure 1 of the accompanying drawings is a side elevation of a fragment of a saw, illustrating my invention; Fig. 2, a view in perspective of an insertible saw-tooth; Fig. 3, a similar view of tooth-holding shank from side and rear; Fig. 4, a similar view of tooth-holding shank from side and front.

Similar letters of reference indicate corresponding parts in all of the figures of the drawings.

A represents a section of a saw-plate, having provided therein circular sockets B, the edge of the sockets to be V-shaped, as shown at $a$ and by the dotted line $a'$ The tooth-holding shank C is of the form shown in the figures of the drawings, having an outer diameter to correspond with the circle of the sockets B, the outer edge of which is provided with a V-shaped groove $b$ to correspond with the V-shaped edge of the circle in the saw-plate, and is shouldered or cut away, as shown at $c$, to form an inclined edge $g$. At the upper portion of said shank is provided a circular recess $d$ and rounded projection $d'$, and in the body thereof, adjacent to the tooth D, with an elongated aperture $e$, which serves to form a yielding brace portion $f$ and spring portion $g$ by the removal of the metal to form the aperture $e$.

The insertible tooth D is provided in form substantially as shown in Fig. 2, having a shoulder $i$, a circular portion $j$ to correspond with the circle of the socket B, a V-shaped groove $k$ to correspond with the V on the face of the circle B, an inclined portion $m^3$, a recess $m'$, and a circular projection $m$ to correspond with the circular recess $d$ in the shank C.

In operation the shank B is turned out, as shown at the left-hand end of Fig. 1, the tooth passed in the circular projection to rest in the recess, the pins of the wrench placed in the perforation $h$ and in the upper end portion of the aperture $e$, and the shank turned into the socket to carry the tooth into the recess, as shown at the right-hand end of Fig. 1. The advantage of this form of structure is that all the elasticity required is provided by the yielding or bending inwardly of the brace $f$ and the wall of the inclined edge $g$ of the shank. The circular projection $m$ of the tooth resting in the depression $d$ and the rounded projection of the shank C resting in the recess $m'$ of the tooth will permit the tooth to rock so as to allow the full length of the circular back $j$ of the tooth to adjust itself to the face of the socket B, the front of the tooth being supported entirely or the projection $m$ resting and turning in the recess $d$. By this form of construction a stronger tooth, as well a stronger shank, is formed and tangential flight of either the tooth or shank prevented.

Having thus described the nature and object of my invention, what I claim as new, and desire to secure by Letters Patent, is—

1. The combination, with a saw-plate having a socket, of an insertible tooth having a shoulder at its upper end, and a tooth-holding shank having an elongated opening in the portion adjacent to the tooth, forming the spring portions $f$ and $g$, substantially as set forth.

2. The combination, with a saw-plate having a circular socket, of an insertible tooth having a shoulder $i$ at its upper rear portion, a circular projection $m$, an inclined edge $m^3$, and a recess $m'$ at its front edge, a tooth-holding shank having a circular depression $d$, to take the projection $m$, a rounded projection $d'$ to fit the recess $m'$, an inclined edge $g$ to bear against the inclined edge $m^3$ of the tooth, and an elongated opening in the portion adjacent to the tooth forming the spring portions $f$ and $g$, substantially as set forth.

In testimony whereof I have hereunto set my hand this 25th day of February, A. D. 1891.

JOHN CLASS.

Witnesses:
W. K. MILLER,
CHAS. R. MILLER.